United States Patent

Jones

Patent Number: 5,862,499
Date of Patent: Jan. 19, 1999

[54] METHOD OF DETECTING A DEFLATED TIRE ON A VEHICLE

[75] Inventor: David Jones, Birmingham, England

[73] Assignee: Sumitomo Rubber Industries, Ltd., Hyogo-ken, Japan

[21] Appl. No.: 795,782

[22] Filed: Feb. 5, 1997

[30] Foreign Application Priority Data

Feb. 7, 1996 [GB] United Kingdom .................. 9062443

[51] Int. Cl.$^6$ .................................................. B60C 23/00
[52] U.S. Cl. ............................ 701/29; 701/31; 73/146.2; 340/444; 116/34 R
[58] Field of Search ...................... 701/29, 31; 116/34 R, 116/34 A, 34 B; 340/444; 73/146.2

[56] References Cited

U.S. PATENT DOCUMENTS

| | | | |
|---|---|---|---|
| 5,239,469 | 8/1993 | Walker et al. | 701/29 |
| 5,248,957 | 9/1993 | Walker et al. | 73/146.2 |
| 5,345,217 | 9/1994 | Prottey | 116/34 R |
| 5,442,331 | 8/1995 | Kishimoto et al. | 340/444 |
| 5,541,573 | 7/1996 | Jones | 340/444 |

FOREIGN PATENT DOCUMENTS

| | | | |
|---|---|---|---|
| 441600A2 | 8/1991 | European Pat. Off. | 340/444 |
| 0652121A1 | 5/1995 | European Pat. Off. . | |
| 0656268A | 6/1995 | Japan . | |

*Primary Examiner*—William A. Cuchlinski, Jr.
*Attorney, Agent, or Firm*—Birch, Stewart, Kolasch & Birch, LLP

[57] ABSTRACT

A method of detecting a deflated tire on a vehicle by comparing the rolling radii of the tires by means of comparing angular velocity speed signal values C1, C2, C3 and C4 from wheel speed sensors on wheels 1–4 at the left-hand front, the right-hand front, the left-hand rear and the right-hand rear wheel position respectively, comprising the step of calculating an error value DEL' in normal driving by processing the four angular velocity speed signal values C1–C4 in a central processing unit (10) which subtracts the sum of the signal values from one pair of diagonally opposite wheels from the sum of the signal values from the other pair of diagonally opposite wheels and expressing the results as a percentage of the mean of the sums $$DEL'=(C1+C4-C2-C3)\times 50/((C1+C2+C3+C4)/4),$$

sensing when the magnitude of the error value DEL' is between a DEL' min value of 0.05 and a DEL' max value of 0.5 and when it is carrying out the step of deciding which tire is apparently deflated by comparison of the angular velocity speed signal values C1–C4 with each other, and finally operating a tire warning indicator in the vehicle to warn the driver that that particular tire is deflated, wherein there is determined from the wheel speed signal values C1–C4 the vehicle speed SPD in which $$SPD=(C1+C2+C3+C4)/(4\times KPHFAC)$$

and wherein KPHFAC is a constant representing the number of wheel speed signals per wheel speed sensor per unit of speed, deriving a corrected error value DEL by dividing the error value DEL' by a correction factor SPDELCOR related to the vehicle speed SPD and using the corrected error value DEL in place of the error value DEL' to warn of a deflated tire.

5 Claims, 1 Drawing Sheet

METHOD OF DETECTING A DEFLATED TIRE ON A VEHICLE

BACKGROUND OF THE INVENTION

The present invention relates to a method of detecting a deflated tire on a vehicle suitable for cars, trucks, buses or the like.

Prior art methods of detecting a deflated or partially deflated tire on a vehicle operate by comparing the rolling radii of the tires. These systems utilize wheel speed signals such as those from electronic anti-lock braking systems (ABS) and compare the signals from each wheel in various ways to determine if one wheel is rotating significantly faster than the others thus indicating a reduced rolling radius caused by the tire being deflated.

The inventor of the present application however has found that for a deflated or partially deflated tire the rolling radius increases significantly with rotational speed due to increasing centrifugal forces which act on the tread mass on the radially outer periphery of the tire. While this phenomenon may also occur to a very limited degree with a normally inflated tire, it apparently is much greater in the case of a deflated tire in which the tread mass is unrestrained by tension on the casing plies.

As a result the speed signal differences, which the deflation warning system compares in order to detect the deflation, decrease with increasing vehicle speed. In fact at very high vehicle speed it has been found that a deflated tire can grow to a diameter beyond that of a normally inflated tire so that the deflation warning system would detect that the other normally inflated tires were apparently deflated.

SUMMARY OF THE INVENTION

Accordingly the object of the present invention is to provide a method of detecting a deflated tire on a moving vehicle which maintains the necessary sensitivity with increasing vehicle speed without incurring false warnings.

According to the present invention a method of detecting a deflated tire on a vehicle by comparing the rolling radii of the tires by means of comparing angular velocity speed signal values C1, C2, C3 and C4 from wheel speed sensors on wheels 1–4 at the left-hand front, the right-hand front, the left-hand rear and the right-hand rear wheel positions, respectively, comprising the step of calculating an error value DEL' in normal driving by processing the four angular velocity speed signal values C1–C4 in a central processing unit which subtracts the sum of the signal values from one pair of diagonally opposite wheels from the sum of the signal values from the other pair of diagonally opposite wheels and expressing the results as a percentage of the mean of the sums $$DEL'=(C1+C4-C2-C3)\times 50/((C1+C2+C3+C4)/4),$$

the step of sensing when the magnitude of the error value DEL' is between a DEL' min value of 0.05 and a DEL' max value of 0.5 and when it is carrying out the step of deciding which tire is apparently deflated by comparison of the angular velocity speed signal values C1–C4 with each other, and finally operating a tire warning indicator in the vehicle to warn the driver that that particular tire is deflated, characterized by determining from the wheel speed signal values C1–C4 the vehicle speed SPD in which $$SPD=(C1+C2+C3+C4)/(4\times KPHFAC)$$

and wherein KPHFAC is a constant representing the number of wheel speed signals per wheel speed sensor per unit of speed, deriving a corrected error value DEL by dividing the error value DEL' by a correction factor SPDELCOR related to the vehicle speed SPD and using the corrected error value DEL in place of the error value DEL' to warn of a deflated tire.

BRIEF DESCRIPTION OF THE DRAWINGS

Further aspects of the present invention will become apparent from the following description by way of example only of one embodiment in conjunction with the following drawings in which.

DETAILED DESCRIPTION OF THE INVENTION

Figure 1:
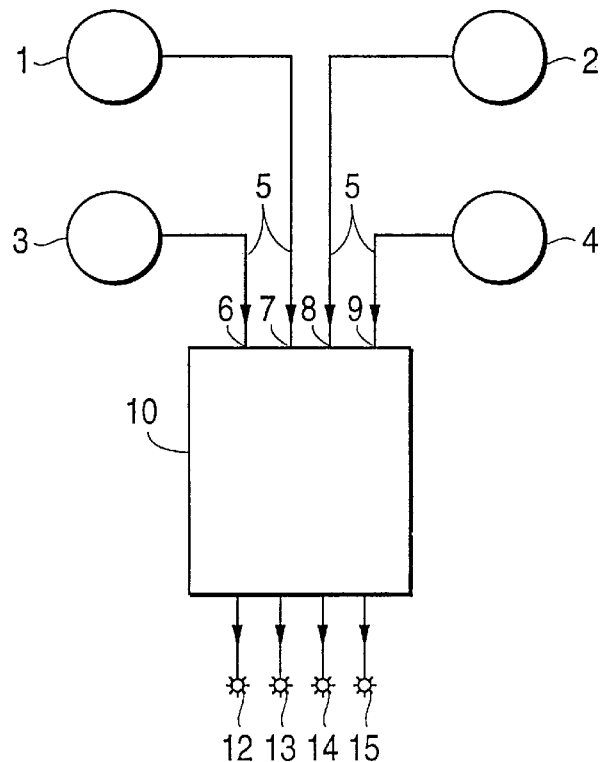
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels respectively and wheels 3 and 4 are the left- and right-hand rear wheel respectively. Each wheel has a toothed wheel device associated with it of the type designed and fitted to provide a digital signal comprising a magnetic pick-up of the type used for a vehicle anti-skid system of the electronic type, often commonly known as the ABS braking system. Each pick-up is additionally connected in this case to the deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system, then the microprocessor 10 may be the same microprocessor as the ABS system. Alternatively a separate microprocessor may be provided.

The respective values of the total digital pulse signals from each of the wheels 1, 2, 3 and 4 in a five second period are C1, C2, C3 and C4 respectively. The central processing unit 10 computes these frequency values as will be described below to determine whether or not to send a deflation warning signal to one of the warning lights 12, 13, 14 or 15.

The method of the present invention proceeds in normal driving by processing the four angular velocity speed signal values C1–C4 in the central processing unit 10 to determine an error value DEL' by subtracting the sum of the signal values from one pair of diagonally opposite wheels from the sum of the signal values from the other pair of diagonally opposite wheels and expressing the result as a percentage of the mean of the sum of the sums, i.e. for example:

However since the magnitude of the error value DEL' is known to decrease with speed it is necessary to determine the vehicle speed SPD by averaging the four wheel speed signal values C1–C4 and dividing by the constant KPHFAC which is the number of wheel speed signals per wheel sensor per unit of speed, i.e.

$$SPD=(C1+C2+C3+C4)/(4\times KPHFAC)$$

and then to correct the value of DEL' by a correction factor SPDELCOR to give a corrected error value DEL.

The correction factor SPDELCOR is determined from a calibration procedure comprising driving the vehicle in a straight line at a plurality of n constant speeds CSP1–CSPn with the tires of three of the wheels, for example wheels 2, 3 and 4, inflated to their normal scheduled pressure and the tire of the remaining wheel partially deflated. The plurality of constant speeds CSP1–CSPn preferably span substantially the speed range capability of the vehicle and includes one particular speed chosen as a reference speed REFSPD. The constant speeds CSP1–CSPn may for example comprise 60, 80, 100 120, 140, 160 kph and higher and the reference speed REFSPD may conveniently be 120 kph.. The deflated tire is preferably deflated by 30% of its normal pressure.

Figure 2:
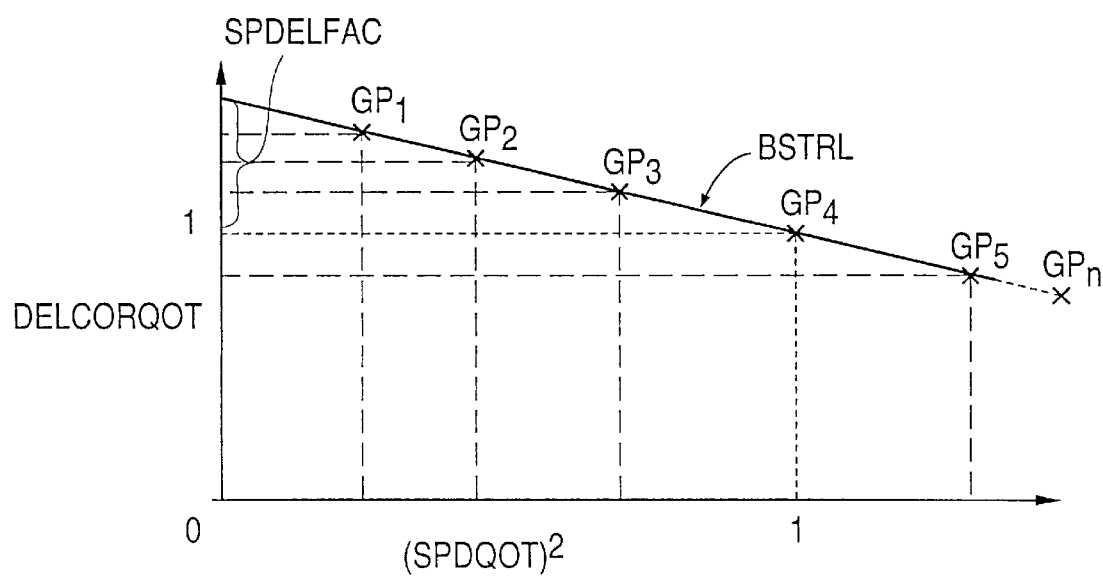
FIG. 2 is a schematic diagram showing the determination of speed factor SPDELFAC by a graphical method.

At each of the constant speeds CSP1–CSPn the wheel speed signal values C1–C4 are monitored and the error value DEL' calculated. Then for each of the n constant speed there is determined a quotient DELCORQOT of the error value DEL' at that speed divided by the error value DEL' at the reference speed REFSPD, and a quotient SPDQOT of the constant speed divided by the reference REFSPD. There is then plotted a two-dimensional Cartesian X–Y graph of the value of DELCORQOT plotted on the vertical Y axis against the square of the value of SPDQOT plotted on the horizontal X axis for each constant speed CSP1–CSPn as shown in FIG. 2.

The determination then proceeds by drawing or deriving by other means such as the Method of Least Squares the straight line BSTRL representing the best fit through the graphical data points GP1–GPn corresponding to constant speeds CSP1–CSPn respectively. A speed factor SPDELFAC is then set equal to the intercept above 1.0 of the straight line BSTRL on the Y axis of DELCORQOT as shown in FIG. 2.

The correction factor SPDELCOR is then determined using SPDELFAC from the relationship $$SPDELCOR=1.0+[SPDELFAX\times(1-SPNS)]$$

wherein SPNS is a speed number square factor which is the square of the quotient of the vehicle speed SPD and the reference speed REFSPD. Thus the corrected error value DEL is then given by the relationship $$DEL=DEL'/SPDELCOR$$

The central processing unit 10 then carries out the step of determining whether or not the magnitude of corrected error value DEL is between a minimum value of 0.05 and a maximum value of 0.5 and when it is the central processor carries out the further step of comparing the wheel angular velocity speed signal C1–C4 with each other to determine which wheel is rotating fastest. A tire warning indicator in the vehicle is then operated to warn the driver that the tire of that wheel is deflated.

In a preferred method the calibration procedure is carried out with the tire of wheel 1 partially deflated.

In a more preferred method the calibration procedure is repeated four times, each time with a different tire partially deflated and thus a value of the individual speed factor SPDELFAC for each wheel is determined. The method is then modified such that when a value of the error value DEL' is detected in the range 0.05 to 0.5 the central processor compares the wheel speed to determine which has the deflated tire and the specific value of the speed factor SPDELFAC for that wheel is used to determine the corrected error value DEL.

Accordingly the present invention provides a method of detecting a deflated tire on a vehicle which maintains the necessary sensitivity with increasing speed.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

Having now described my invention what I claim is:

1. A method of detecting a deflated tire on a vehicle by comparing the rolling radii of the tires by means of comparing angular velocity speed signal values C1, C2, C3 and C4 from wheel speed sensors on wheels 1–4 at the left-hand front, the right-hand front, the left-hand rear and the right-hand rear wheel position respectively, comprising the step of calculating an error value DEL' in normal driving by processing the four angular velocity speed signal values C1–C4 in a central processing unit (10) which subtracts the sum of the signal values from one pair of diagonally opposite wheels from the sum of the signal values from the other pair of diagonally opposite wheels and expressing the results as a percentage of the mean of the sums $$DEL'=(C1+C4-C2-C3)\times 50/((C1+C2+C3+C4)/4),$$

sensing when the magnitude of the error value DEL' is between a DEL' min value of 0.05 and a DEL' max value of 0.5 and when it is carrying out the step of deciding which tire is apparently deflated by comparison of the angular velocity speed signal values C1–C4 with each other, and finally operating a tire warning indicator in the vehicle to warn the driver that that particular tire is deflated, wherein there is determined from the wheel speed signal values C1–C4 the vehicle speed SPD in which $$SPD=(C1+C2+C3+C4)/(4\times KPHFAC)$$

and wherein KPHFAC is a constant representing the number of wheel speed signals per wheel speed sensor per unit of speed, deriving a corrected error value DEL by dividing the error value DEL' by a correction factor SPDELCOR related to the vehicle speed SPD and using the corrected error value DEL in place of the error value DEL' to warn of a deflated tire.

2. The method according to claim 1, wherein the correction factor SPDELCOR is determined from $$SPDELCOR=1.0+[SPDELFAC\times(1-SPNS)]$$

wherein SPNS is a speed number square factor being the square of the quotient of the vehicle speed SPD and a reference speed REFSPD
i.e. $SPNS=(SPD/REFSPD)^2$
and wherein SPDELFAC is a speed factor determined by a calibration procedure comprising driving the vehicle in a straight line at a plurality of n constant speeds CSP1–CSPn representing substantially the whole of the speed range capability of the vehicle and including the reference speed REFSPD with the tires of three of the wheels inflated to their normal scheduled pressures and the tire of the remaining wheel deflated, calculating the error value DEL' for each constant speed, plotting a two-dimension Cartesian graph of ordinate values of the quotient DEL' CORQOT of DEL' at each constant speed CSP1–CSPn divided by the DEL' at the reference REFSPD against abscissa values of the square of a quotient SPDQT of each constant speed CSP1–CSPn divided by the reference speed REFSPD, determining the best straight line through the graphical points and setting the speed factor SPDELFAC to the intercept above 1.0 of the ordinate value at the zero value of SPNS.

3. The method according to claim 2, wherein in the calibration procedure the tire of wheel 1 is partially deflated.

4. The method according to claim 2, wherein the reference speed REFSPD is 120 kph.

5. The method according to claim 2, wherein values of the speed factor SPDELFAC are determined for all four wheels 1–4 of the vehicle and when a particular wheel is identified as deflated, then the corresponding value of SPDELFAC is used to calculate SPDELCOR to correct the error value DEL'.

* * * * *